(12) United States Patent
Alex et al.

(10) Patent No.: US 6,361,730 B1
(45) Date of Patent: *Mar. 26, 2002

(54) COMPOSITE SHAPED ARTICLES COMPRISING VULCANIZED ELASTOMERS AUTOGENOUSLY BONDED TO POLYAMIDE/POLYETHER THERMOPLASTIC ELASTOMERS

(75) Inventors: Patrick Alex, Limours Pecquese; Christian Dousson, Bernay; Loic Tron, Levallois-Perret; Martine Cerf, Bernay, all of (FR)

(73) Assignee: Elf Atochem S.A., Puteaux (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/436,829

(22) Filed: May 8, 1995

(30) Foreign Application Priority Data

May 6, 1994 (FR) .............................. 94 05612

(51) Int. Cl.⁷ .............................. B29C 45/16
(52) U.S. Cl. .................. 264/255; 264/259; 264/266; 264/319; 264/331.13; 264/331.18; 264/331.19
(58) Field of Search .................. 428/474.7, 475.5, 428/475.8, 476.1, 492, 500, 521, 474.9; 427/372.2, 384, 393.5; 36/25 R, 28, 30 R, 32 R; 264/255, 259, 266, 279, 328.8, 319, 331.13, 331.18, 331.19

(56) References Cited

U.S. PATENT DOCUMENTS

| 3,962,011 | A | * | 6/1976 | Van Gils ................ 156/110 A |
| 4,727,133 | A | * | 2/1988 | Liedloff .................... 528/288 |
| 5,122,420 | A | * | 6/1992 | Baron et al. ............. 428/474.4 |
| 5,132,182 | A | * | 7/1992 | Grosse-Puppendahl et al. .. 428/475.8 |
| 5,444,120 | A | * | 8/1995 | Liedloff .................... 525/66 |
| 5,482,995 | A | * | 1/1996 | Krantz .................... 525/41 |
| 5,506,024 | A | * | 4/1996 | Flesher .................... 428/85 |
| 5,624,994 | A | * | 4/1997 | Hert et al. ................. 524/505 |

FOREIGN PATENT DOCUMENTS

EP 0550346 7/1993

* cited by examiner

Primary Examiner—Suzanne E. McDowell
(74) Attorney, Agent, or Firm—Pennie & Edmonds LLP

(57) ABSTRACT

The present invention relates to a process for forming composite shaped articles used for athletic shoe soles, tubes, pipes, transmission belts and conveyor belts, comprising a vulcanized elastomer directly or autogenously bonded, that is, essentially in the absence of adhesive, to a thermoplastic elastomer comprising recurring polyamide-6 and polyether structural units, such as thermoplastic polyetheresteramide elastomers, are provided. The article is prepared by a process comprising placing a thermoplastic elastomer component into a vulcanization mold, overmolding onto at least a portion of the surface area of one face surface of the thermoplastic elastomer component with a vulcanizable elastomer component, and vulcanizing the vulcanizable elastomer component at a temperature below the melting point of the thermoplastic elastomer component but over a wide temperature range, which can be about 40° C. or higher.

12 Claims, No Drawings

COMPOSITE SHAPED ARTICLES COMPRISING VULCANIZED ELASTOMERS AUTOGENOUSLY BONDED TO POLYAMIDE/POLYETHER THERMOPLASTIC ELASTOMERS

BACKGROUND OF THE INVENTION

1. Technical Field of the Invention

The present invention relates to composite shaped articles comprising a vulcanized elastomer directly or autogenously bonded, i.e., essentially in the absence of adhesive, to a thermoplastic elastomer comprising recurring polyamide-6 and polyether structural units, for example to thermoplastic polyetheresteramide elastomers.

2. Description of the Prior Art

EP-0,550,346 describes composite materials formed from a vulcanized elastomer in adhesive-free combination with a thermoplastic elastomer comprising polyamide sequences. These materials can exist in the form of a vulcanized elastomer sheet adhering to a sheet of the thermoplastic elastomer. By "adhesive-free combination" is intended that the two elastomers adhere by themselves to one another and that, if an attempt is made to separate them, failure of one of the two elastomers occurs.

This is cohesive failure, in contrast to adhesive failure when the separation takes place at the interface of the two elastomers.

The composite material of the prior art can be produced by vulcanization of the elastomer in a mold, a part of which is occupied by the thermoplastic elastomer comprising polyamide sequences.

To date, it is necessary to carry out the vulcanization over a temperature range having a magnitude of at most 5° C.

If this range is not observed, the risk exists of obtaining poor adhesion (adhesive failure), or difficulties in removing the composite material from the mold.

This prior art technique is useful for producing shoe soles, but it is difficult, in an industrial plant having many molds which are opened and closed frequently, to avoid temperature variations with a magnitude greater than 5° C.

SUMMARY OF THE INVENTION

It has now unexpectedly been determined that composite shaped articles can be prepared from a thermoplastic elastomer comprising sequences based on polyamide-6 and polyether sequences, at vulcanization temperature varying over a temperature range, the magnitude of which can be as high as several tens of degrees and often more than 40° C.

The composite materials thus produced are subject to cohesive failure, rather than adhesive failure, whatever the vulcanization temperature selected within this wide range. Thus, they are less subject to delamination.

Briefly, the present invention features a composite material comprising a vulcanized elastomer which is adhered, essentially without adhesive or autogenously bonded, to a thermoplastic elastomer comprising recurring structural units based on polyamide-6 and polyether sequences.

The present invention also features a process for the preparation of such composite material.

DETAILED DESCRIPTION OF BEST MODE AND PREFERRED EMBODIMENTS OF THE INVENTION

More particularly according to the present invention, the vulcanizable synthetic or natural elastomers which are suitable for the subject composites are well known to this art; the term "elastomer" also includes mixtures of a number of elastomers.

These elastomers or elastomer mixtures exhibit a compression set (C.S.) at 100° C. of less than 50%, generally ranging from 5% to 40% and preferably of less than 30%.

Exemplary of these are natural rubber, polyisoprene having a high degree of double bonds in the cis-orientation, a polymerized emulsion based on styrene/butadiene copolymer, a polybutadiene having a high degree of double bonds in the cis-orientation prepared via catalysis with nickel, cobalt, titanium or neodymium, a halogenated ethylene/propylene/diene terpolymer, a halogenated butyl rubber, a styrene/butadiene block copolymer, a styrene/isoprene block copolymer, the halogenated products of the above polymers, an acrylonitrile/butadiene copolymer, an acrylic elastomer, a fluorinated elastomer and chloroprene. Epichlorohydrin rubbers are also included.

In the event that the elastomers indicated above do not contain carboxylic acid functional groups or anhydrides thereof (which is the case in the majority of such instances), said functional groups will be introduced by grafting, in known manner, the elastomers indicated above or any mixtures of elastomers, for example with acrylic elastomers.

The selection will advantageously be made from among the elastomers indicated above, of the following: carboxylated nitrile elastomers, acrylic elastomers, carboxylated polybutadienes, grafted ethylene/propylene/diene terpolymers or mixtures of these polymers with the same elastomers, but ungrafted, such as nitrile rubbers, polybutadienes or ethylene/propylene/diene terpolymers, whether alone or in admixture.

The aforesaid vulcanizable elastomers preferably contain a degree by weight of carboxylic acid functional groups or dicarboxylic acid anhydride functional groups ranging from 0.3% to 10% with respect of said elastomers.

The vulcanization systems or initiators which are suitable for the present invention are well known to this art and the invention is consequently not limited to a specific type of system.

When the elastomer is based on an unsaturated monomer (butadiene, isoprene, vinylidene/norbornene, and the like), four types of vulcanization systems are exemplary:

(1) Sulfur systems comprising sulfur in combination with the usual accelerators such as metal salts of dithiocarbamates (zinc or tellurium dimethyldithiocarbamate, and the like), sulfuramides, and the like.

These systems can also contain zinc oxide in combination with stearic acid.

(2) Sulfur donor systems in which the majority of the sulfur employed for the bridgings emanates from sulfur-containing molecules such as the organosulfur compounds indicated above.

(3) Phenol resin systems comprising difunctional phenol/formaldehyde resins, which may be halogenated, in combination with accelerators such as stannous chloride or zinc oxide.

(4) Peroxide systems; all of the free radical donors can be used (dicumyl peroxides, and the like) in combination with zinc oxide and stearic acid.

When the elastomer is acrylic (poly(butyl acrylate) with acid or epoxy functional groups or any other reactive functional group which enables crosslinking), conventional crosslinking agents based on diamines ((ortho-tolyl) guanidine, diphenylguanidine, and the like), or on blocked diamines (hexamethylenediamine carbamate, and the like), are used.

The elastomeric compositions can be modified for certain specific properties (improvement in the mechanical properties, for example) by the addition of fillers such as carbon black, silica, kaolin, aluminum, clay, talc, chalk, and the like. These fillers can be surface-treated with silanes, poly(ethylene glycol)s or any other coupling molecule. In general, the amount of filler material in parts by weight ranges from 5 to 100 per 100 parts of elastomers.

In addition, the compositions can be rendered flexible by plasticizers such as mineral oils derived from petroleum, phthalic acid or sebacic acid esters, liquid polymer plasticizers such as optionally carboxylated low molecular polybutadiene and other plasticizers well known to this art.

The combinations of vulcanization agents used for carrying out the subject process are such that they must permit complete crosslinking of the elastomer according to kinetics providing good properties of resistance to separation, as indicated above, and in general to good rubber properties (measured by a compression set at 100° C., tensile-test properties, and the like).

As regards the thermoplastic elastomers which comprise polyether sequences and recurring structural units based on polyamide-6, these can be distributed in a statistical or regular fashion. The polyamide units can be isolated or grouped in oligomers emanating from the condensation of caprolactam.

By "based on polyamide-6" are intended that the polymers are homopolymers of caprolactam or copolymers with C6 diamines and diacids or lauryllacitam or any other structural unit, the polyamide units being comprised essentially of caprolactam residues.

The most typical elastomers are those comprising polyamide blocks and polyether blocks. The polyamide blocks can emanate from the condensation of caprolactam.

These polyamide blocks can be prepared in the presence of a diacid. Polyamide blocks having carboxylic acid endgroups are obtained. The $\overline{Mn}$ of the polyamide blocks advantageously ranges from number-average molecular weight 600 to 5,000.

The polyethers include, for example, poly(ethylene glycol), polypropylene glycol) or poly(tetramethylene glycol) having a number-average molecular weight ranging from 250 to 6,000. A plurality of polyethers can be bonded together, for example, via diacid in the case of polyetherdiols.

It is also within the scope of the invention to employ other elastomers comprising polyamide blocks and polyether blocks. These can be prepared via reaction of lactam, diacid and polyetherdiol or polyetheramine. It is also possible to condense polyamide blocks containing amine endgroups with polyether diacids or to condense polyamide blocks comprising acid endgroups with polyetherdiamines.

Such elastomers are described in U.S. Pat. Nos. 4,331, 786, 4,115,475, 4,195,015, 4,839,441 and 4,864,014.

Elastomers comprising polyamide-6 blocks having a number-average molecular weight ranging from 1,000 to 3,000 are advantageously employed.

Among these elastomers, preferred are those having polyether blocks originating from poly(tetramethylene glycol) (PTMG). The number average molecular weight of these PTMG preferably ranges from 300 to 2,000.

EP-550,346 mandates carrying out the vulcanization at a temperature close to the Vicat point of the thermoplastic elastomer, for example in the temperature range extending from the Vicat point to 5° C. below the Vicat point.

The Vicat point or, alternatively, the softening point is a well known parameter for measuring the physical properties of a polymer. The Vicat point is the temperature at which a needle having a circular cross-section of 1 $mm^2$ penetrates to a depth of 1 mm into the sample during a temperature increase of 50° C. per hour according to ASTM Standard D1525. Thus, at this temperature, the polymer does not display plastic flow and is not in the molten state.

If this temperature range is not observed, a material having at best adhesive failure is obtained.

Thus, it has now surprisingly been determined that using thermoplastic elastomers comprising recurring structural units based on polyamide-6 and polyether sequences, the vulcanization could be carried out over a wider range than that of the prior art.

These thermoplastic elastomers have a melting point ranging from 170° to 220° C. and Vicat point ranging from 130° to 180° C.

Advantageously, the kinetics, measured by means of an oscillating rheometer, will be such that the characteristic time for vulcanization to 90%, $t_{90}$, does not exceed 15 minutes and advantageously will range from 5 to 10 minutes.

Moreover, it was found that the time for initiation of vulcanization (or setting time) corresponding to an increase in torque of 0.2 N.m was a significant factor in obtaining materials having good performances. Thus, it is advantageous for the aforesaid increase in torque to be attained in a time greater than or equal to 4 minutes at the molding temperature and preferably ranging from 4 to 6 minutes.

Generally, the process entails forming the thermoplastic elastomer comprising polyamide structural units and polyether sequences and then depositing, by any appropriate means, the thermoplastic elastomer comprising polyamide structural units in a vulcanization mold, such that, preferably, it is affixed against one of the wall members of the mold. Thus, in the event that the elastomer is a film, the film is formed especially by extrusion. Its thickness will preferably range from 0.3 to 5 mm and advantageously is less than or equal to 1 mm. The width of the film is variable and it can be cut with a punch. The piece of film is then positioned against at least a part of the wall of the vulcanization mold for the elastomer, in known manner. The pieces of film can also be stored for any desired time.

In the event that the thermoplastic elastomer is formed from a component of defined shape, for example in the shape a cut section, the latter is preferably affixed to the base of the mold.

It is also possible to use a sequenced two-material injection mold. In this case, the mold is equipped with cavity covers for the elastomer portion, which are removed after injection of the thermoplastic to permit injection of the elastomer to be vulcanized.

The elastomeric composition containing the elastomer with the fillers, plasticizers and other adjuvants, but without the crosslinking system, is formulated in an appropriate reactor and is then introduced, optionally, into another mixer, at an appropriate temperature, with the vulcanization system.

The molding of the elastomer, as well as the vulcanization thereof, is carried out in the mold, part of which is occupied by the elastomer piece comprising polyamide structural units as indicated above, according to one of the conventional processes of the rubber industry: simple compression, transfer compression, injection of transfer injection. In general, it is carried out in a steel compression mold, with a thickness of a few millimeters, placed between two heating plates of a press. The amount of elastomeric composition introduced into the mold can slightly exceed the volume of the cavity. Closing the press initiates plastic flow of the elastomer via the overflow channels. Thus, after a distribution of material, and taking account of the geometry of the mold, the pressure on the elastomeric composition is low (in the region of atmospheric pressure).

The melting point and Vicat point of the thermoplastic elastomers comprising polyamide recurring structural units of the invention are a function of the polyamide units and the polyether blocks.

The temperature range for vulcanization is also a function of the polyamide structural units and of the polyether blocks.

The advantage of the elastomers comprising polyamide structural units is that the vulcanization can be carried out well below its melting point.

The vulcanization temperature range is that wherein the material obtained exhibits an essentially cohesive failure. The lower limit is defined as being the lowest temperature which provides an adhesion of cohesive failure type. The upper limit is not in general established by the property of the material obtained, but is the maximum temperature which permits the material to be easily removed from the mold without plastic deformation or adhesion of the elastomer comprising polyamide structural units to the walls of the mold, or a sticking of the material to the walls of the mold.

For example, the thermoplastic elastomers comprising polyamide-6 blocks having a number average molecular weight of 1,300 and polyether blocks derived from PTMG and having a number average molecular weight of 650 permit a vulcanization range of 140° to 180° C. This comprises the usual vulcanization temperature of rubber, i.e., 155° C.

It is also within the scope of this invention to apply a minor amount of the adhesive to the face surface of the elastomer comprising polyamide recurring structural units.

When vulcanization is complete, after a period of time of less than 15 minutes, advantageously from 5 to 10 minutes, determined beforehand by the $t_{90}$ of the oscillating rheometer, the article is removed.

In the event that the thermoplastic elastomer comprising polyamide structural units is a film, an empirical formula which is well known to the art of vulcanization of elastomers is applied when the thickness is changed:

$$\text{Vulcanization time (min)} = t_{90} + \left(\frac{E}{2} - 2\right)$$

in which E is the thickness in mm.

The resistance to separation is assessed by various standardized tests which will be selected according to the type of composite material under consideration.

If the polyether comprising polyamide blocks is in the form of a film, the resistance to separation will be measured by the peel test. The resistance to peeling will advantageously be greater than 5 daN/cm.

In the event, the most advantageous from an industrial standpoint, that the thermoplastic elastomer comprising polyamide structural units is a block or article having a defined shape, for example a reinforcing component partially embedded or inserted in the vulcanized elastomer, the tensile strength will be measured. The tensile strength will vary depending on the shape of the item.

The present invention is particularly applicable for the production of sporting goods which are at least in part comprised of a composite material as described above.

The invention is thus well suited for the production of soles for sports footwear, at least a part of which is made of a vulcanized elastomer containing one or more reinforcing components of a thermoplastic elastomer as described above.

In a specific embodiment of the present invention, the composite material successively comprises (a') a vulcanized elastomer, (b') a thermoplastic elastomer comprising structural units based on polyamide-6 and polyether sequences and (c') a mixture comprising polyamide-6 or polyamide-6,6 and, optionally, one or more polyolefins, the component (a') adhering essentially without adhesive to the component (b') and with the proviso that component (c') can only be PA-6 or PA-6,6.

By "polyolefins" are intended polymers comprising recurring olefin structural units such as, for example, ethylene, propylene or 1-butene units, and the like.

Exemplary of such polyolefins are:

(a) polyethylene, polypropylene, and copolymers of ethylene with α-olefins, it being possible for these polymers to be grafted with anhydrides of unsaturated carboxylic acids such as maleic anhydride or unsaturated epoxides such as glycidyl methacrylate;

(b) copolymers of ethylene with at least one comonomer selected from among (i) unsaturated carboxylic acids, or salts or esters thereof, (ii) vinyl esters of saturated carboxylic acids, (iii) unsaturated dicarboxylic acids, or salts, esters, hemiesters or anhydrides thereof, or (iv) unsaturated epoxides, it being possible for these ethylene copolymers to be grafted with anhydrides of unsaturated dicarboxylic acids or unsaturated epoxides;

(c) styrene/(ethylene/butene)/styrene (SEBS) block copolymers, optionally comprising maleic functional groups.

Mixtures of two or more of these polyolefins can of course also be used.

The polyolefin is advantageously:

(1) polyethylene,
(2) copolymers of ethylene and an α-olefin,
(3) copolymers of ethylene and an alkyl (meth)acrylate,
(4) copolymers of ethylene, an alkyl (meth)acrylate and maleic anhydride, the maleic anhydride being grafted or copolymerized,
(5) copolymers of ethylene, an alkyl (meth)acrylate and glycidyl methacrylate, the glycidyl methacrylate being grafted or copolymerized, and
(6) polypropylene.

It is advantageous, to facilitate mixing, and if the polyolefins have few or no functional groups which can facilitate compatibilization, to add a compatibilizer.

The compatibilizer is a material or agent per se for compatibilizing polyamides and polyolefins.

Exemplary of such compatibilizing agents are:

(a) polyethylene, polypropylene, ethylene/propylene copolymers or ethylene/butene copolymers, each of these polymers being grafted by maleic anhydride of glycidyl methacrylate;

(b) ethylene/alkyl (meth)acrylate/maleic anhydride copolymers, the maleic anhydride being grafted or copolymerized;

(c) ethylene/vinyl acetate/maleic anhydride copolymers, the maleic anhydride being grafted or copolymerized;

(d) the copolymers (b) and (c) in which the maleic anhydride is replaced by glycidyl methacrylate;

(e) ethylene/(meth)acrylic acid copolymers, and optionally, the salts thereof; and (f) polyethylene, polypylene or ethylene/propylene copolymers, these polymers being grafted by a comonomer having a site which reacts with amines, these grafted copolymers then being condensed with polyamides or polyamide oligomers having a single amine endgroup.

These compatibilizing agents are described in FR-2,291,225 and EP-342,066, hereby expressly incorporated by reference.

The amount of polyamide constituting the matrix advantageously ranges from 55 to 95 parts per 5 to 45 parts of polyolefin.

The amount of compatibilizer is the amount sufficient for the polyolefin to disperse in the form of nodules in the polyamide matrix. It can constitute up to 20% of the weight of the polyolefin. These polymers are prepared by mixing the polyamide, the polyolefin and, optionally, the compatibilizer according to the usual techniques for mixing in the molten state (twin-screw, Buss or single-screw).

The mixture advantageously comprises polyamide-6 (PA-6) or polyamide-6,6 (PA-6,6) in which either nodules of a mixture of low density polyethylene and of a copolymer of ethylene, of alkyl (meth)acrylate and of maleic anhydride or of glycidyl methacrylate, or nodules of polypropylene, are dispersed.

Such mixtures are described in U.S. Pat. No. 5,070,145 and EP-564,338.

In the case of polypropylene, a compatibilizer is added which is advantageously an ethylene/propylene copolymer, principally propylene units in number, grafted by maleic anhydride and then condensed subsequently with monoamine oligomers of caprolactam.

These polyamide and polyolefin mixtures can be plasticized and can optionally include filler materials such as carbon black and the like.

Such polyamide and polyolefin mixtures are described in U.S. Pat. No. 5,342,886.

The material according to this specific embodiment of the invention is the above material, except that an additional layer (c) of a mixture comprising PA-6 or PA-6,6 and, optionally, one or more polyolefins has been added on the side of the thermoplastic elastomer comprising structural units based on polyamide-6 and polyether sequences.

This material comprising (a'), (b') and (c') can be produced exactly as the material comprising (a') and (b'), by replacing (b') with (b') and (c') in combination; (b) and (c) in combination can be prepared by coextrusion, laminating, etc.

It too is within the scope of this invention to deposit a coextrusion binder between the layers (b') and (c'). These binders are materials per se known to this art.

Exemplary of such binders are (1) polyethylene, polypropylene, copolymers of ethylene and at least one α-olefin or mixtures of these polymers, each of these polymers being grafted by anhydrides of unsaturated carboxylic acids such as, for example, maleic anhydride (mixtures of these grafted polymers and of these ungrafted polymers can also be used), and (2) copolymers of ethylene with at least one comonomer selected from among (i) unsaturated carboxylic acids, their salts or their esters, (ii) vinyl esters of saturated carboxylic acids, (iii) unsaturated dicarboxylic acids, their salts, their esters, their hemiesters or their anhydrides, or (iv) unsaturated epoxides, these copolymers optionally being grafted by anhydrides of unsaturated dicarboxylic acids, such as maleic anhydride, or unsaturated epoxides, such as glycidyl methacrylate.

It is also possible to add to one or to each of the layers a product which improves their adhesion without requiring use of a binder layer. This product can be the binder described above.

These materials can exist in various forms. They are, for example, pipes or tubes having an internal layer made of polyamide (c). They can be manufactured by coextrusion; for example, the layers (b') and (c') are coextruded and then sheathing is carried out with rubber, followed by vulcanization. In these pipes, the layer (b') is in fact a binder.

In another embodiment, these are coextruded sheets or panels which are in the form of belts, such as transmission belts, which are mechanically strong. It is also possible, before depositing the rubber layer, to draw or stretch the material formed by the layers (b') and (c') in order to modify the mechanical properties thereof.

In yet another embodiment, they are conveyor belts.

The invention is thus advantageously well suited for the production of soles for sports footwear, at least a part of which is made of vulcanized elastomer containing one or more reinforcing components comprising the thermoplastic elastomer described above.

In order to further illustrate the present invention and the advantages thereof, the following specific examples are given, it being understood that same are intended only as illustrative and in nowise limitative.

In said examples to follow, the elastomeric composition, without the crosslinking system, was formulated in a 3.5-liter Repiquet K1 internal mixer, the rotors of which rotated at 60 rpm. The operation was carried out under semi-adiabatic conditions, with conversion of the mechanical energy into heat. An intimate mixture was obtained in less than 5 minutes and the temperature attained a value of 110° C.

The elastomer thus formulated was then introduced into a mixing mill with rolls heated to 80° C. and the vulcanization system was added thereto.

Overmolding onto the piece made of thermoplastic elastomer comprising polyamide sequences with the elastomeric composition was carried out in a steel compression mold placed between the two heating plates of a press.

The peel force w as measured at the end of 24 hours. Peeling was initiated by pulling an adhesion-free region inserted between the vulcanized elastomer and the polyether comprising polyamide blocks, i.e., an aluminum adhesive tape placed on the polyether comprising polyamide blocks before molding the elastomer.

EXAMPLE 1

The following SBR/XNBR formulation was prepared.

| | |
|---|---|
| SBR 1502 (styrene/butadiene rubber) | 70 |
| XNBR 775 (carboxylated nitrile rubber) | 30 |
| Silica VN3 | 30 |
| DOP (Dioctyl phthalate) | 5 |
| PEG 4000 (Poly(ethylene glycol)) | 2 |
| Si 69 | 1 |
| $TiO_2$ | 10 |
| Wingstay L | 1 |
| Polyvest C 70 | 4 |
| Stearic acid | 2 |

-continued

| | |
|---|---|
| ZnO | 5 |
| MBTS | 1.5 |
| TMTD | 0.5 |
| Sulfur | 2 |
| Vulkalent E | 1 |
| | 165 |
| Ts2 at 165° C.: | 4 min, 30 sec |

Ts2 represents the scorch time of the rubber formulation at the vulcanization temperature (according to a Monsanto rheogram).

It was then poured into a mold formed from a thermoplastic elastomer having the compositions:

Pebax 1 was a block copolymer prepared via the condensation of PA-6 blocks of $\overline{Mn}$ 2,000 containing acid endgroups with PTMG blocks of $\overline{Mn}$ 1,000.

Pebax 2 was the same as Pebax 1, except that the PA-6 blocks were of $\overline{Mn}$ 1,300 and the PTMG blocks of $\overline{Mn}$ 650.

The results obtained are reported in the following Table 1:

TABLE 1

| Melting point (° C.) | Vicat point (° C.) | Pebax type | T° C. mini* | T° C. maxi* | T° C. | Peel force daN/cm | Cohesive + Adhesive 0 failure |
|---|---|---|---|---|---|---|---|
| 213 | 181 | Pebax 1 | 180 | | 160 | 1.45 | 0 |
| | | | | | | 8 | + |
| | | | | 195 | | 7.6 | + |
| 195 | 148 | Pebax 2 | 140 | | 160 | 8 | + |
| | | | | | | 8.1 | + |
| | | | | 180 | | 10 | + |

*T° mini and T° maxi are the vulcanization limit temperatures for obtaining cohesive failure without deforming the Pebax film and which permitted the composite to be removed from the mold while hot.

EXAMPLE 2 (COMPARATIVE)

The procedure was the same as in Example 1, except that the thermoplastic elastomers comprised polyamide-12 structural units and PTMG structural units.

Pebax 3 represents copolymers the same as Pebax 1, except that the polyamide blocks were PA-12 blocks of $\overline{Mn}$ 2,000.

Pebax 4 represents copolymers the same as Pebax 1, except that the polyamide blocks were PA-12 blocks of $\overline{Mn}$ 4,000.

Pebax 5 represents copolymers the same as Pebax 1, except that the polyamide blocks were PA-12 blocks of $\overline{Mn}$ 5,000.

The results obtained are reported in Table 2:

TABLE 2

| Melting point (° C.) | Vicat point (° C.) | Pebax type | T° C. mini* | T° C. maxi* | T° C. | Peel force daN/cm | Failure |
|---|---|---|---|---|---|---|---|
| | | | 153 | | | 10 | + |
| 158 | 144 | Pebax 3 | | 160 | | 10 | + |
| | | | 160 | | | | + |
| 195 | 161 | Pebax 4 | | | 162 | 10 | + |
| | | | | 166 | | | + |
| | | | 165 | | | | + |
| 172 | 165 | Pebax 5 | | | | | |
| | | | | 170 | | 11.6 | + |

EXAMPLE 3
Elastomeric Formulation Based on XNBR

A composition was prepared, in an internal mixer, comprising, in parts by weight:

| | |
|---|---|
| XNBR RCG 7343 (carboxylated nitrile rubber marketed by Goodyear) | 110 |
| Silica KS 300 | 20 |
| DIUP (Diisoundecylenyl phthalate) | 5 |
| PEG 4000 (Poly(ethylene glycol)) | 2 |
| TiO$_2$ (Titanium dioxide) | 5 |
| Si69 (coupling agent) | 1 |
| Wingstay 29 (heat antioxidant) | 1 |
| Polyvest | |
| C70 (coupling agent) | 4 |

This composition was roll mixed with a vulcanization system having the composition:

| | |
|---|---|
| Sulfur | 1.8 |
| ZnO (zinc oxide) | 5 |
| Stearic acid | 1 |
| MBTS | 1.5 |
| TMTD | 0.5 |

The Ts2 of this formulation, measured using a Monsanto rheometer, was 4 min, 35 s, at 160° C.

This formulation, provided with its vulcanization system, was the n poured onto an overmold formed from a film of polyether containing polyamide blocks (Pebax 2 of Example 1), the thickness of which was 0.5.

The molding conditions were the following: 40 bars at a given temperature (T) (reported in Table III below) for a time of 10 min.

The results obtained are also reported in Table 3:

TABLE 3

| Test | Temperature T ° C. | Peel force (daN/cm) | Failure type |
|---|---|---|---|
| 1 | 155 | 11.2 | cohesive |
| 2 | 170 | 10.7 | cohesive |
| 3 | 180 | 10.7 | cohesive |

The molding temperatures indicated permitted vulcanizing the rubber and removing the composites from the mold while hot, without deformation of the Pebax film.

This example evidences that it is possible to attain satisfactory adhesion values, which are at least equivalent to those reported in Comparative Example 2, over an operational temperature range of 25° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for making an article having a plurality of components comprising the steps of:
    placing a thermoplastic elastomer component having polyamide-6 and polyether recurring structural units into a vulcanization mold;
    overmolding a vulcanizable elastomer component onto at least a portion of one face surface of the thermoplastic elastomer component; and vulcanizing the vulcanizable elastomer component at a temperature below the melting point of the thermoplastic elastomer component, said process being further characterized in that the vulcanizing step is carried out at a temperature within a range defined by a lower temperature limit and an upper temperature limit, wherein the lower temperature limit is the lowest temperature at which the two elastomer components adhere by themselves to one another such that, when an attempt is made to separate them, cohesive failure occurs; and wherein the upper temperature limit is the highest temperature at which the vulcanized article can be removed from the mold without plastic deformation or adhesion of the thermoplastic elastomer component to the mold.

2. The process according to claim 1, wherein the vulcanization is carried out at a temperature of about 40° C. or higher and the vulcanized elastomer component is autogenously bonded to the thermoplastic elastomer component.

3. The process according to claim 1, wherein the polyether recurring structural unit comprises poly(tetramethylene glycol).

4. The process according to claim 1, wherein the thermoplastic elastomer component comprises a polyetheresteramide.

5. The process according to claim 1, wherein the vulcanizable elastomer component comprises a natural or synthetic rubber.

6. The process according to claim 5, wherein the vulcanizable elastomer component is substantially free of carboxylic acid functional groups or anhydrides thereof.

7. The process according to claim 1, wherein the vulcanizable elastomer component comprises carboxylic acid or dicarboxylic acid anhydride functional groups.

8. The process according to claim 1, wherein the vulcanizable elastomer component comprises from 5 to 100 parts by weight of filler material per 100 parts by weight thereof.

9. The process according to claim 1, wherein the thermoplastic elastomer component comprises blocks of polyamide-6 and blocks of polyether.

10. The process according to claim 9, wherein the blocks of polyamide-6 have a number-average molecular weight ranging from 600 to 5,000 and the blocks of polyether have a number average molecular weight ranging from 250 to 6,000.

11. The process according to claim 1, further comprising a step of bonding a second polymer component to another face surface of the thermoplastic elastomer component, the second polymer component comprising an admixture of polyamide-6 and polyamide-6,6.

12. The process according to claim 11, wherein the admixture further comprises a polyolefin.

* * * * *